United States Patent
Toshikuni et al.

[11] Patent Number: 5,841,804
[45] Date of Patent: Nov. 24, 1998

[54] METHOD AND APPARATUS FOR REGENERATING GAS USED IN CARBON DIOXIDE LASER GENERATOR

[75] Inventors: Masami Toshikuni; Setsuo Shibata, both of Oarai-machi, Japan

[73] Assignee: JGC Corporation, Tokyo

[21] Appl. No.: 364,197

[22] Filed: Dec. 27, 1994

Related U.S. Application Data

[63] Continuation-in-part of Ser. No. 851,933, Mar. 16, 1992, abandoned.

[30] Foreign Application Priority Data

Mar. 14, 1991 [JP] Japan ..................... 3-49657

[51] Int. Cl.$^6$ .............. H01S 3/22; B01J 38/12; B01D 53/00
[52] U.S. Cl. .................. 372/59; 502/38; 502/514; 423/210; 423/219; 423/239.7; 423/247; 423/215.5; 423/580.1; 423/655
[58] Field of Search .................. 372/59; 502/38, 502/52, 514; 423/219, 655, 656, 580.1, 437.2, 248, 247, 239.1, 215.5, 210

[56] References Cited

U.S. PATENT DOCUMENTS

| | | | |
|---|---|---|---|
| 1,366,176 | 1/1921 | Harger et al. | 423/247 |
| 3,810,043 | 5/1974 | Locke et al. | 331/94.5 |
| 4,651,324 | 3/1987 | Prein et al. | 372/59 |
| 4,752,595 | 6/1988 | McCullen et al. | 502/50 |
| 4,829,035 | 5/1989 | Upchurch et al. | 502/34 |
| 5,279,997 | 1/1994 | Montreuil et al. | 502/62 |

FOREIGN PATENT DOCUMENTS

| | | |
|---|---|---|
| 2062708 A1 | 9/1992 | Canada . |
| 55-124287 A | 9/1980 | Japan . |
| 60-3169 A | 1/1985 | Japan . |
| 60-60793 A | 4/1985 | Japan . |
| 61-290793 A | 12/1986 | Japan . |
| 3-84980 A | 4/1991 | Japan . |
| 6-152008 A | 5/1994 | Japan . |

OTHER PUBLICATIONS

Smith et al. "Catalysis in Sealed Co$_2$ Lasers" *J Phys. D:Appl. Phys.* vol. 7, Printed in Great Britain pp. 1652–1659, 1974 no month.

Sorem et al. "Catalytic Converters for Closed–Cycle Operation . . . " *Rev. Sci. Instrum.* vol. 52 No. 8 pp. 1193–1196, 1981 Aug.

Olsen *Unit Processes and Principles of Chemical Engineering* 250 Fourth Ave. New York, D. Van Nostrand Co., Inc. pp. 1–3, 1932 no month.

*Primary Examiner*—Gary P. Straub
*Assistant Examiner*—Timothy C. Vanoy
*Attorney, Agent, or Firm*—Armstrong, Westerman, Hattori, McLeland & Naughton

[57] ABSTRACT

An improved method and apparatus for regeneration and reuse of He—N$_2$—CO$_2$ mixed gas for carbon dioxide gas laser. The laser gas after use is contacted with a noble metal catalyst (for example, Pt—Al$_2$O$_3$) at a temperature of 200°–300° C. to react CO and O$_2$ formed by laser discharge so as to form CO$_2$. A suitable quantity of moisture in the contained laser gas causes steam-reforming reaction of H$_2$O and CO, and reaction of H$_2$ and O$_2$ following thereto, and continuous operation over a long period is thus possible. Poisoning of the catalyst by NO$_x$ is suppressed at this relatively high temperature of reaction. Activity of the catalyst, when decreased, may be recovered by reactivation by passing a reactivating gas consisting of carbon monoxide, oxygen and helium through the catalyst bed at a temperature of 400° to 500° C.

2 Claims, 10 Drawing Sheets

METHOD AND APPARATUS FOR REGENERATING GAS USED IN CARBON DIOXIDE LASER GENERATOR

This application is a continuation-in-part of application Ser. No. 07/851,933, filed Mar. 16, 1992 now abandoned.

BACKGROUND OF THE INVENTION

1. Field of the Invention

The present invention concerns a method of regenerating mixed gas used in a carbon dioxide laser generator with the aid of a catalyst as well as an apparatus for working the method. The invention further concerns a method of reactivating the catalyst by recovering it from poisoning by $NO_x$.

2. State of the Art

As the laser gas for carbon dioxide laser generator of high output and high pulse there has been used a mixed gas consisting of He, $N_2$ and $CO_2$. Due to discharging a portion of $CO_2$ is decomposed to CO and $O_2$, and if $O_2$ remains in the laser gas, output of the laser generator decreases and arcing discharge will occur.

Under constant supply of fresh gas and release of deteriorated gas the high output can be maintained. However, He-gas which shares a major part of the mixed gas for laser is expensive, and supply of the fresh mixed gas as demanded makes the running costs very high. Thus, efforts have been made to recombine CO and $O_2$ formed in the carbon dioxide laser generator to form $CO_2$ and reuse the thus regenerated gas. It is known that noble metal catalysts are useful for practicing the reaction.

The inventors intended to provide an industrially practicable method of regenerating the mixed gas used in the carbon dioxide laser, and established the method which enables reuse of the mixed gas containing CO and $O_2$, which are products of discharging by recombining them, and disclosed it (Japanese Patent Disclosure Hei 3-84980).

The method comprises preheating the mixed gas used in the carbon dioxide laser generator and contacting it with a catalyst to react CO and $O_2$ in the mixed gas, while utilizing the reaction heat for preheating the mixed gas to be treated, and then, cooling the reacted gas to the temperature suitable for reuse in the laser oscillation and, after removing dust therefrom, recycling it to the laser generator. The reaction conditions preferable for this regeneration are: reaction temperature 80°–200° C., space velocity of the mixed gas in the catalytic reactor 4,000–14,000/Hr. working under pressure makes it possible to use a lower reaction temperature and reduce the size of the apparatus, and therefore, is recommended. Practically, if practiced under a pressure of 5 kg/cm².G or higher, an efficient reaction can be achieved even at a preheating temperature as low as near the normal temperature (about 40° C.), and the loads of the preheater and the cooler may be much reduced.

The method proved to be successful to some extent. However, in case where the operation continued for a long period, particularly, operated under the conditions where the laser output is high, the activity of the catalyst decreases and the regeneration of the gas becomes insufficient.

Influence of moisture contained in the laser gas at laser discharge was discussed in Japanese Patent Disclosures Nos. 60-60793, 60-3169 and 61-290793. In these technologies molecular sieves or silica gel are used as moisture absorbing agent to dry the laser gas to such extent that the dew point of the gas is in the range of −30° to −70° C. When the absorption saturates renewal of the moisture absorbing agent is necessary. This is a troublesome work. Further, it is not easy to control the moisture content of the laser gas in the laser chamber.

The inventors found that moisture in the laser gas is rather useful if it is contained in a suitable quantity, because the moisture or $H_2O$ reacts CO which is adsorbed on the laser gas regenerating catalyst to form $CO_2$ and $H_2$, the resulting $H_2$ reacts $O_2$ to regenerate $H_2O$ and thus, accumulation of $O_2$ in the laser gas is prevented.

SUMMARY OF THE INVENTION

An object of the present invention is to provide an industrial method of regenerating the mixed gas used in the carbon dioxide laser generator so that the gas may be used repeatedly, and that the activity of the catalyst lasts long. Another object of the invention is to provide a method of reactivating the deteriorated catalyst. To provide an apparatus for working the above noted methods is also the object of the present invention.

DETAILED DESCRIPTION OF THE PREFERRED EMBODIMENTS

The method of regenerating carbon dioxide laser gas according to the present invention is a method of regenerating He—$N_2$—$CO_2$ mixed gas used in carbon dioxide gas laser for reuse, which method comprises: contacting laser gas used in the laser and containing 50–200ppm $H_2O$ with a noble metal catalyst at a mixed gas temperature exceeding 200° C. and up to 350° C. to cause reaction of CO with $O_2$ and $NO_x$ in the used gas so as to regenerate $CO_2$ and $N_2$, and to cause reaction of $H_2O$ with CO to regenerate $CO_2$ and form $H_2$, and to fix $O_2$ with thus formed $H_2$; utilizing heat energy generated by the exothermic reactions to preheat the unreacted mixed gas; cooling the reacted mixed gas to a temperature usable in the laser; removing dust from the mixed gas; and recycling the mixed gas to the laser.

A portion of the moisture or $H_2O$ in the laser gas may be decomposed by laser discharge to form $H_2$ and $O_2$. The resulting $O_2$ reacts CO, which is also a discharge product of $CO_2$, to regenerate $CO_2$.

Suitable space velocity for passing the mixed gas in the catalyst bed is in the range of 4,000–15,000/Hr.

The method of reactivating the catalyst according to the present invention is to reactivate the catalyst with lowered activity due to poisoning by $NO_x$ formed by laser discharge in practice of the above described method of regenerating the mixed gas, and comprises passing a regenerating gas consisting of 0.2–0.8% of CO, 0.1–0.4% of $O_2$ and the balance of He through the catalyst layer at a temperature of 400°–500° C.

Figure 1:
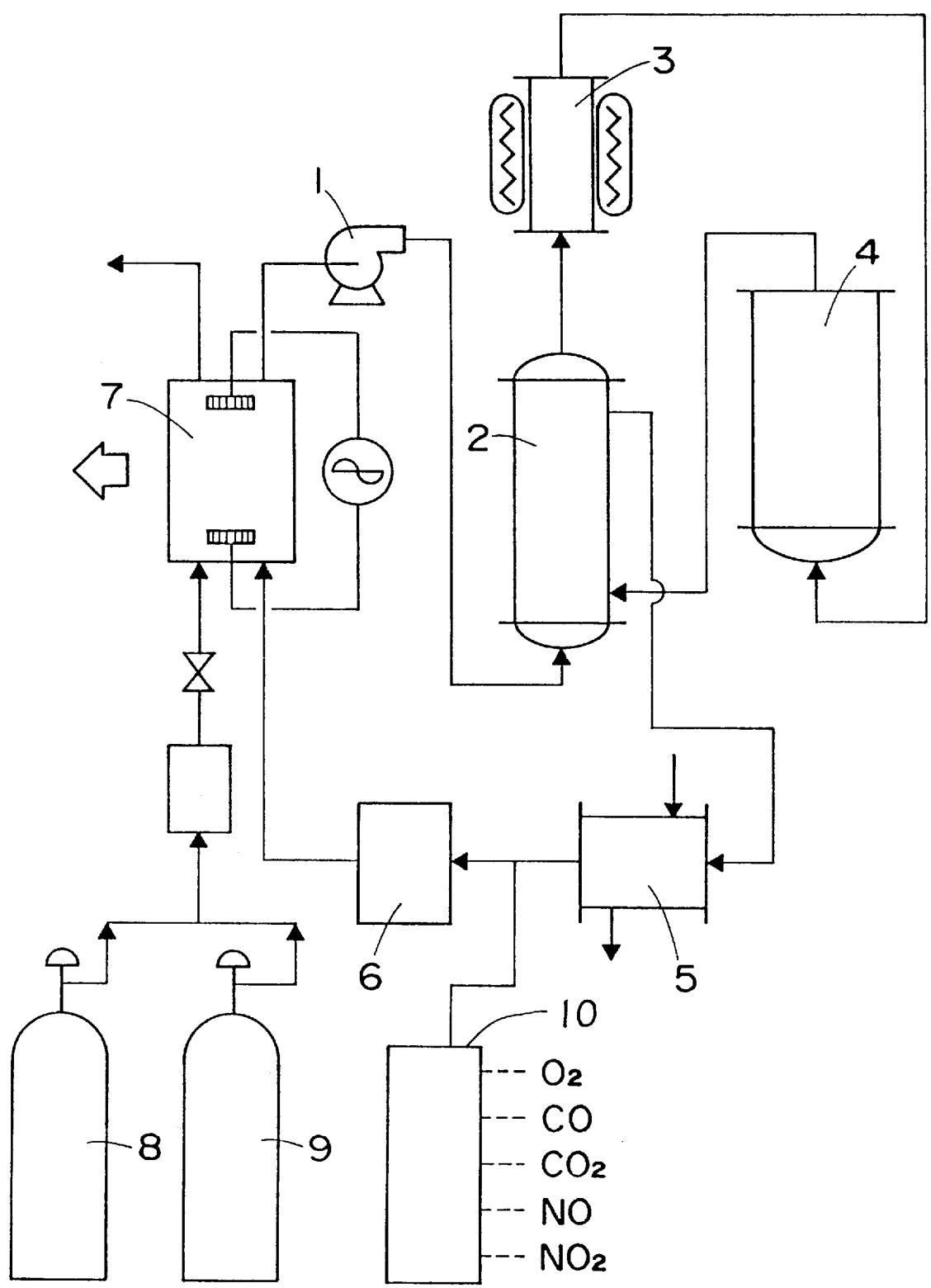
FIG. 1 is a flow chart illustrating the structure of the apparatus for regenerating the gas for laser generator.

The apparatus for regenerating the gas for carbon dioxide gas laser according to the present invention, with which the above described method of regenerating the mixed gas, and the method of reactivating the catalyst are carried out, comprises, as illustrated in FIG. 1: a gas preheater 3 for preheating the mixed gas; a reactor 4 which is packed with a noble metal catalyst for reacting CO with $O_2$, $NO_x$ and $H_2O$ in the preheated laser gas to obtain regenerated laser gas and having a means for heating the noble metal catalyst to a temperature of 400°–500° C.; a gas cooler 5 for cooling the regenerated laser gas; a heat exchanger 2 for heating the mixed gas to regenerate with the regenerated laser gas; a filter 6 for removing dust from the regenerated laser gas after cooling; a means for recycling the regenerated laser gas to the laser such as a blower 1; and a means for supplying a He—CO—$O_2$ mixed gas 9 to the reactor.

In FIG. 1, numeral reference 7 indicates a laser generator and reference 10, a gas analyzer.

The reactor to be employed in the present invention is, preferably, a type of self heat exchanging or a reactor in which the gas before the reaction is heated by the gas after the reaction. The apparatus must be durable to the temperature of 400°–500° C. because the reactivation of the catalyst is carried out at this level of temperature.

Preferable catalysts to be used in this invention are those of noble metals such as Pt, Rh and Pd supported on a carrier such as alumina or silica, which are known as the CO-oxidation catalyst. Particularly, Pt—$Al_2O_3$ catalyst is the most useful. The content of the precious metal in the catalyst is usually in the range of 0.3–5%.

The gas cooler and the filter may be chosen from the known apparatus on the basis of the reaction conditions and the quantity of the gas to be treated. The filter preferably has the performance of removing 99.9% or more of the dust of particle sizes of 0.1 micrometer or more.

In the practical use of the gas regeneration apparatus of the present invention, $O_2$-concentration in the laser chamber should be decreased to such a extent that neither lowering of output nor arc discharge may not occur. Therefore, it is not necessary to regenerate whole the gas circulated in the system, but it is sufficient to draw out a portion of the gas to the regenerator and return the regenerated gas to the laser chamber. It is convenient to supply the gases for reactivation and pretreatment of the catalyst through the laser generator.

In the He—$N_2$—$CO_2$ mixed gas for the carbon dioxide gas laser generator CO and $O_2$ occur due to the discharge therein as the result of the following reactions:

$$CO_2+e^-=CO+O^*+e^- \quad O^*+O^*=O_2$$

It has been practiced to regenerate $CO_2$ by causing the reaction between the CO and the $O_2$ with the aid of a catalyst:

$$CO+0.5O_2=CO_2$$

The inventors investigated the reason of relatively rapid slowdown of the activity of the catalyst for this reaction and found that NO and $NO_2$ (hereinafter represented by "$NO_x$") occur due to the discharge in accordance with the following reactions:

$$N_2+e^-=N^*+N^*+e^-$$

$$N^*+O^*=NO$$

$$NO+O^*=NO_2$$

and that the $NO_x$ is strongly adsorbed at a temperature from normal up to 200° C. by the active sites to poison the catalyst. Quantity of $NO_x$ generated in the gas is very slight under the conditions where the laser output is low, and the $NO_x$ does not cause a serious problem. The quantity, however, increases if the laser output is heightened. Poisoning by $NO_x$ is significant at a lower reaction temperature (80°–200° C.) chosen in the previous invention. In the present invention, the activity of regenerating the deteriorated gas is maintained for much longer period by choosing a higher temperature (200°–350° C.).

Moisture in the laser gas reacts CO on the catalyst, as noted above, to cause steam-reforming reaction, and thus formed $H_2$ reacts $O_2$ formed by laser discharge to fix it as $H_2O$. These reactions prevent accumulation of $O_2$ in the system.

$$H_2O+CO=H_2+CO_2$$

$$H_2+0.5O_2=H_2O$$

Control of water content in the laser gas to a suitable amount, i.e., 50 to 200 ppm, can be advantageously carried out by controlling water content of the catalyst to be packed in the reactor. In that case starting up of the laser apparatus will be done in the following procedures:

1) The catalyst is dried prior to packing to a predetermined water content. Suitable moisture content of the catalyst depends on the ratio of the circulated laser gas amount to the catalyst amount to be packed.

2) The catalyst dried to a predetermined moisture content is packed in the reactor of the laser gas regenerator. The regenerator is connected to the laser apparatus and, after sufficient decreasing of $O_2$ content in the system by evacuation, valves between them are opened.

3) Laser gas is introduced from the laser apparatus to the regenerator.

4) A circulation blower for the laser apparatus and the regenerator is started to operate, and at the same time, the heater of the regenerator is started to heat the catalyst layer. Moisture in a small amount adsorbed to the catalyst vaporizes as the temperature goes high, and is circulated with the laser gas.

5) When temperature reached to the temperature suitable for the laser gas regeneration, laser discharge may be started.

After shutting down the laser apparatus and the regenerator the laser gas can be kept confined in the system. As the temperature of the catalyst layer decreases the moisture of a small amount in the laser gas is adsorbed by the catalyst, and therefore, there occurs no condensation of the water in the laser chamber.

When the activity of the catalyst decreased significantly, the $NO_x$ adsorbed by the catalyst is reduced in accordance with the following reactions:

$$NO+CO=0.5N_2+CO_2 \qquad (7)$$

so that the catalyst may be recovered from poisoning and reactivated. Thus, it is possible to repeat the procedures of regenerating the mixed gas for carbon dioxide gas laser generator.

The technology of regenerating the mixed gas according to the present invention ensures enjoying the merits of the previously proposed invention that enables repeated use of the used gas for laser in the carbon dioxide gas laser generator and reduction of the running costs for the laser operation for a long period of time. The method of reactivating the catalyst makes it possible to reactivate the catalyst of lowered activity due to the poisoning and to use it repeatedly. The investment for the apparatus for regenerating the laser gas is low and the space necessary for the apparatus is also small.

EXAMPLES

Experimental Example

Figure 2:
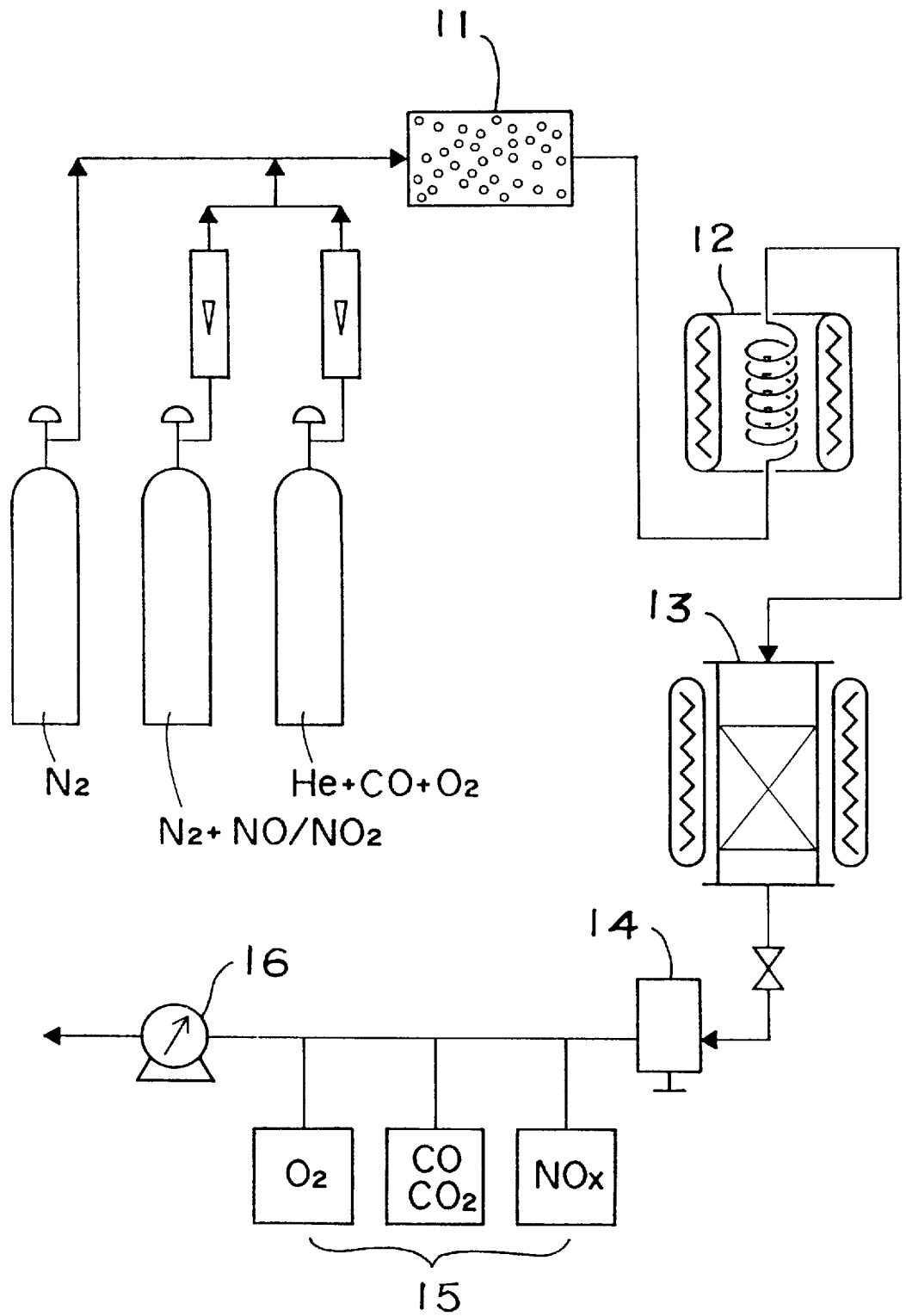
FIG. 2 is a flow chart illustrating the experimental apparatus with which the present invention was established.

An experimental apparatus as illustrated in FIG. 2 was composed and used to determine the activity, extent of poisoning and effect of reactivation. In the figure numeral reference 11 indicates a gas mixer; 12, a gas heater; 13, a reactor; 14, a pressure maintaining valve; 15, a gas analyzer; and 16, a gas meter. The catalyst used was of the following specification:

Pt—$Al_2O_3$(supported Pt: 4.3 g/liter)

Particles (particle size: 3±0.3 mm)

Bulk density 0.36 kg/liter

Pore volume (BET) 1.4 $cm^3/g$

There were supplied $N_2$ gas and two kinds of mixed gases ($N_2$+NO/$NO_2$ and He+CO+$O_2$) from bombs to the mixer 11 at a determined rates, and thus obtained mixed gases were, after being heated in a heater 12 to a determined temperature, introduced into the reactor 13. The gases from the reactor pass the pressure maintaining valve 14 and were subjected to volume measurement, and then, released to an exhaust system. Analysis of the gases were carried out with the apparatus 15 equipped at the downstream of the pressure maintaining valve.

Firstly, $N_2$ gas containing NO of 100 ppm was supplied at a rate of SV=5000/Hr, and the temperature was changed from 20° C. to 50° C. and 150° C., to observe changes in adsorption. At 20° C. and 50° C., a breakthrough, i.e., detection of NO at the outlet of the reactor was appreciated 5 minutes after the introduction of the gas. At 150° C., however, it was determined that it takes about 10 minutes until the breakthrough begins. Thus, it was found that the time until the breakthrough is longer at a higher temperature.

Then, after having the active points poisoned with NO, He—CO—$O_2$ (CO/$O_2$=2/1) mixed gas was passed to determine whether the activity recovers. When an $N_2$gas containing NO of 58.1 ppm was passed at 88° C. for 140 minutes, the catalytic activity for the reaction of CO+$O_2$ became extremely low. Then, passing pure $N_2$ gas at 100° C. for 7 minutes resulted in a temporary recovery of the activity, but the activity decreased in a short period, and the recovery of the activity was 50% or so.

Figure 3:
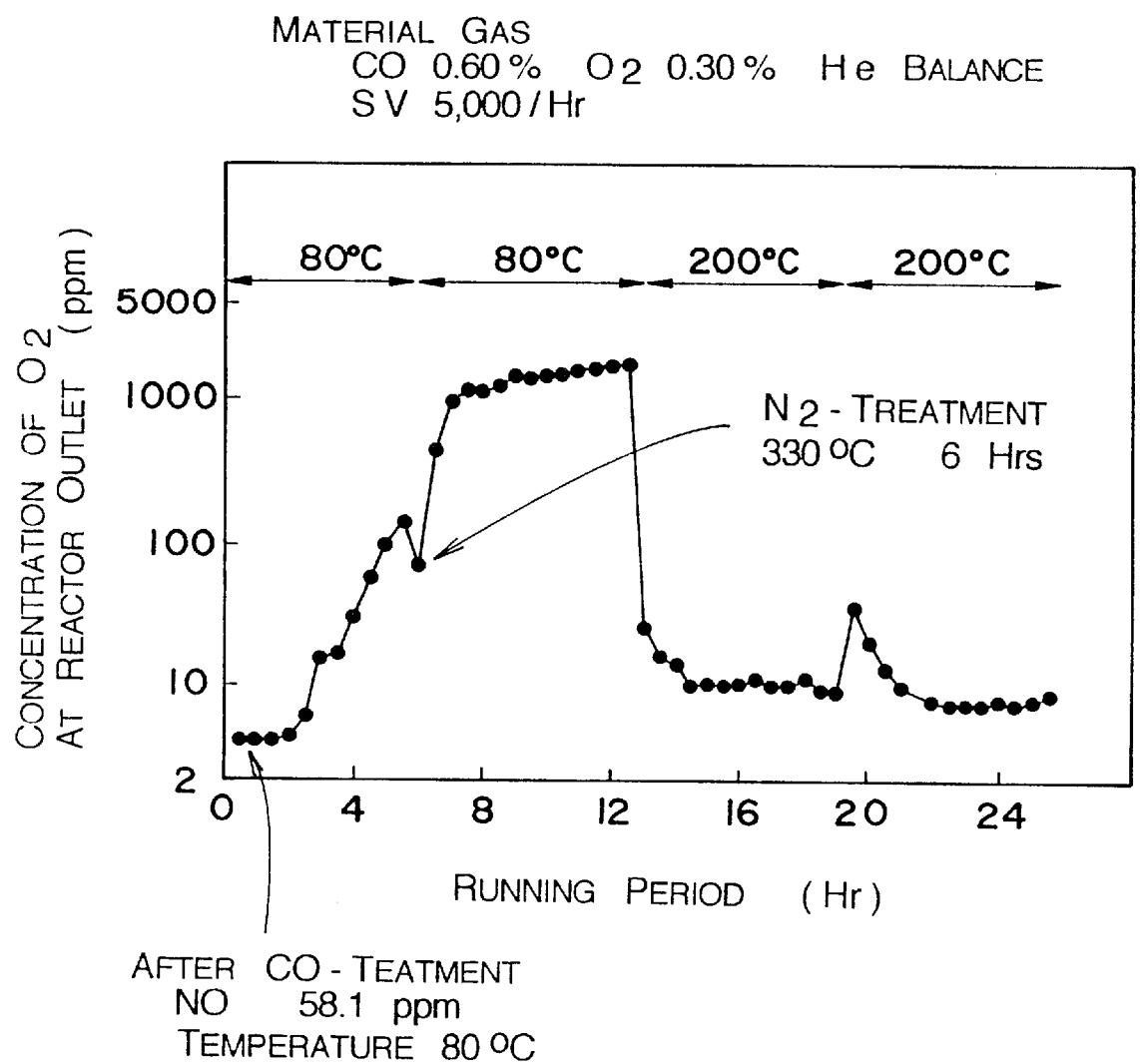
FIG. 3 concerns experimental data for the present method, or the graph showing that the Pt—$Al_2O_3$ catalyst used in the laser gas regenerating apparatus recovers its activity at a high temperature after being poisoned by NO.

In order to investigate the influence of the reaction temperature, experiments under the conditions shown in FIG. 3 were carried out. At first, the catalyst pretreated with He—CO gas was subjected to NO-poisoning (with the above mentioned $N_2$ gas containing 58.1 ppm NO) to the saturation, and then He—CO—$O_2$ mixed gas (CO/$O_2$=2/1) was passed at 80° C. In the first 2 hours activity was appreciated, but it decreased rapidly. After 6 hours $N_2$ gas was passed at 330° C. for 6 hours, and no recovery of the activity was appreciated.

The reaction temperature was elevated to 200° C., and He—CO—$O_2$ mixed gas (CO: 0.60%, $O_2$: 0.30%, the balance: He) was passed at a rate of SV=5000 /Hr. The activity recovered to the initial level. In the graph of FIG. 3, a temporary decrease of the activity is recorded after 19 hours. This might have been caused by rerun of the experiments after standing without flowing gas for a whole day, and the reason is considered to be that the adsorbed CO and $O_2$ moved around on the catalyst surface to inactivate the active points thereof.

Figure 4:
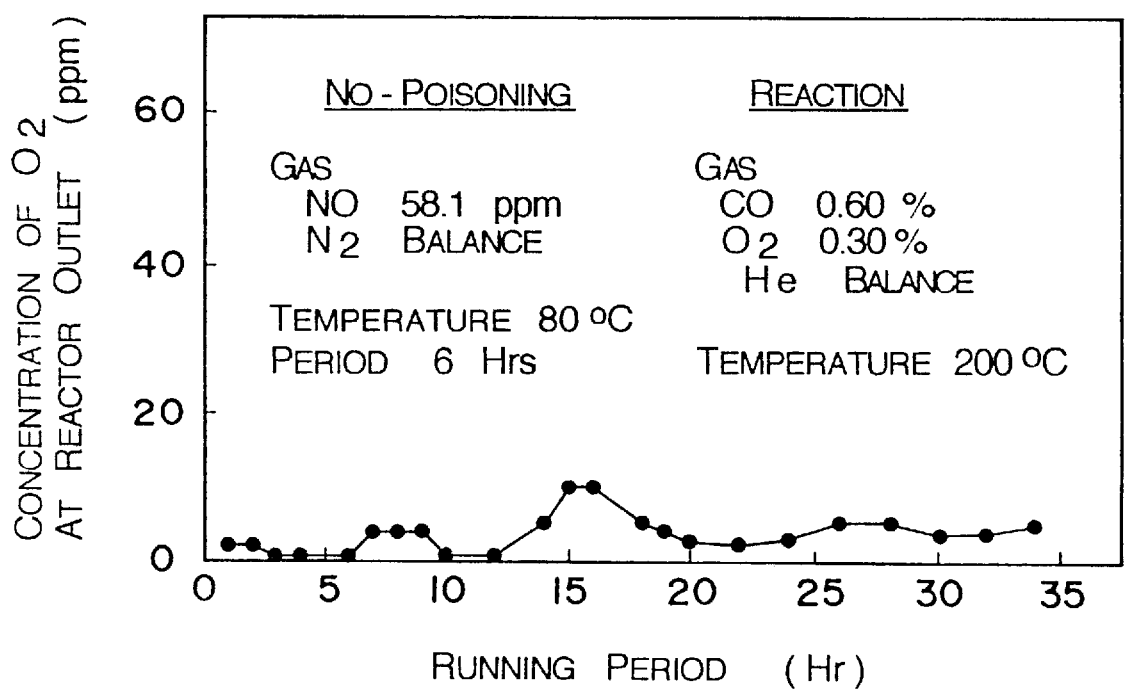
FIG. 4 also concerns experimental data showing that the gas regeneration carried out subsequent to the experiments of FIG. 3 lasts for a long period of time.

The catalyst was subjected to NO-poisoning under the same conditions as mentioned above, and then, to reactivation with the mixed gas of the same composition as above and under the conditions of temperature and flow rate also mentioned above. The results are shown in FIG. 4. From the graph of the figure it is understood that the catalyst, even after lapse of 30 hours, retains sufficient activity to promote the reaction of CO+$O_2$.

Figure 5:
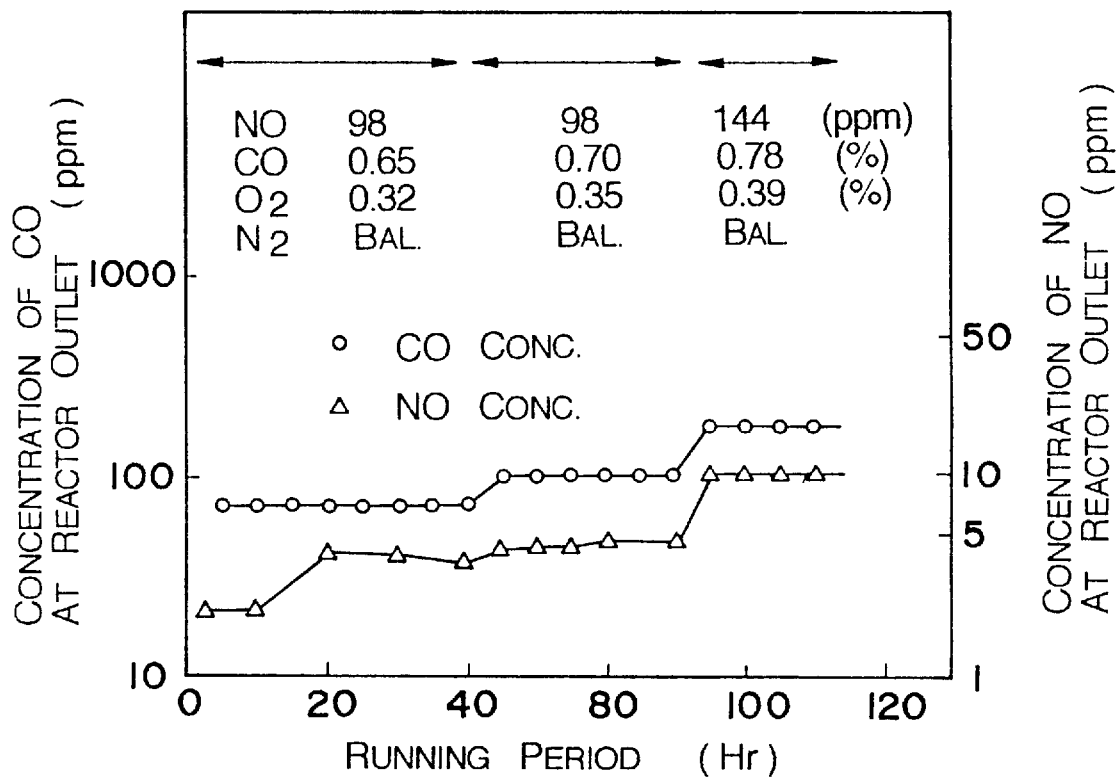
FIG. 5 also concerns experimental date showing the results of regeneration of a gas having a composition simulating the composition after use of the laser gas according to the present invention.

The gases of three different compositions similar to those after use in the carbon dioxide gas laser generator were supplied, and the contents of CO and NO at the outlet of the reactor were determined. The results are as in FIG. 5. The catalyst activity remained high without remarkable changes. The reason why the CO-content is relatively high is considered to be the preferential reactions of:

$$NO+0.5\ O_2 =NO_2$$

to the reactions of:

$$NO+CO=0.5\ N_2+CO_2$$

$$CO+0.5\ O_2 =CO_2$$

On the basis of the fact that the content of NO is suppressed low, it is expected that, even though $NO_x$ occurs in the laser gas after use, the catalyst will not be significantly deteriorated and can be used for a long time.

Working Example 1

In the apparatus of the structure shown in FIG. 1, a cylindrical reactor was used and a mesh was placed in the bottom thereof, on which 12 liters of 0.5% Pt—$Al_2O_3$ catalyst was packed with packing of Raschig rings thereon. Temperature sensors were put in the catalyst layer for measuring the changes of the temperatures at the upper part (gas inlet side), intermediate part, and the lower part (gas outlet side) of the catalyst layer so as to determine how the activities change at the respective parts of the catalyst layer.

The reactor was combined with a carbon dioxide gas laser generator, to which a He—$N_2$—$CO_2$ mixed gas was supplied through a mass-flow control valve. A portion of the gas was sampled and transferred to the above regeneration apparatus with a blower. The transferred gas was, after being subjected to heat recovery at the heat exchanger, heated at the heater and introduced into the reactor at a temperature of 250°–300° C. for recombination reaction of the side products at the catalyst layer. The gas, by way of the heat exchanger, moves to the cooler and is cooled to a temperature lower than that of the laser chamber. The cooled gas is recycled to the laser generator after being filtered for removal of the dust therein.

Quantitative analysis of $NO_x$ was done at the inlet and the outlet of the reactor under keeping the temperature of the catalyst layer constant at 300° C. with varying quantities of the recycled gas, and the gas conversion and $O_2$-reactivity were calculated. The results are shown in Table 1.

Figure 6:
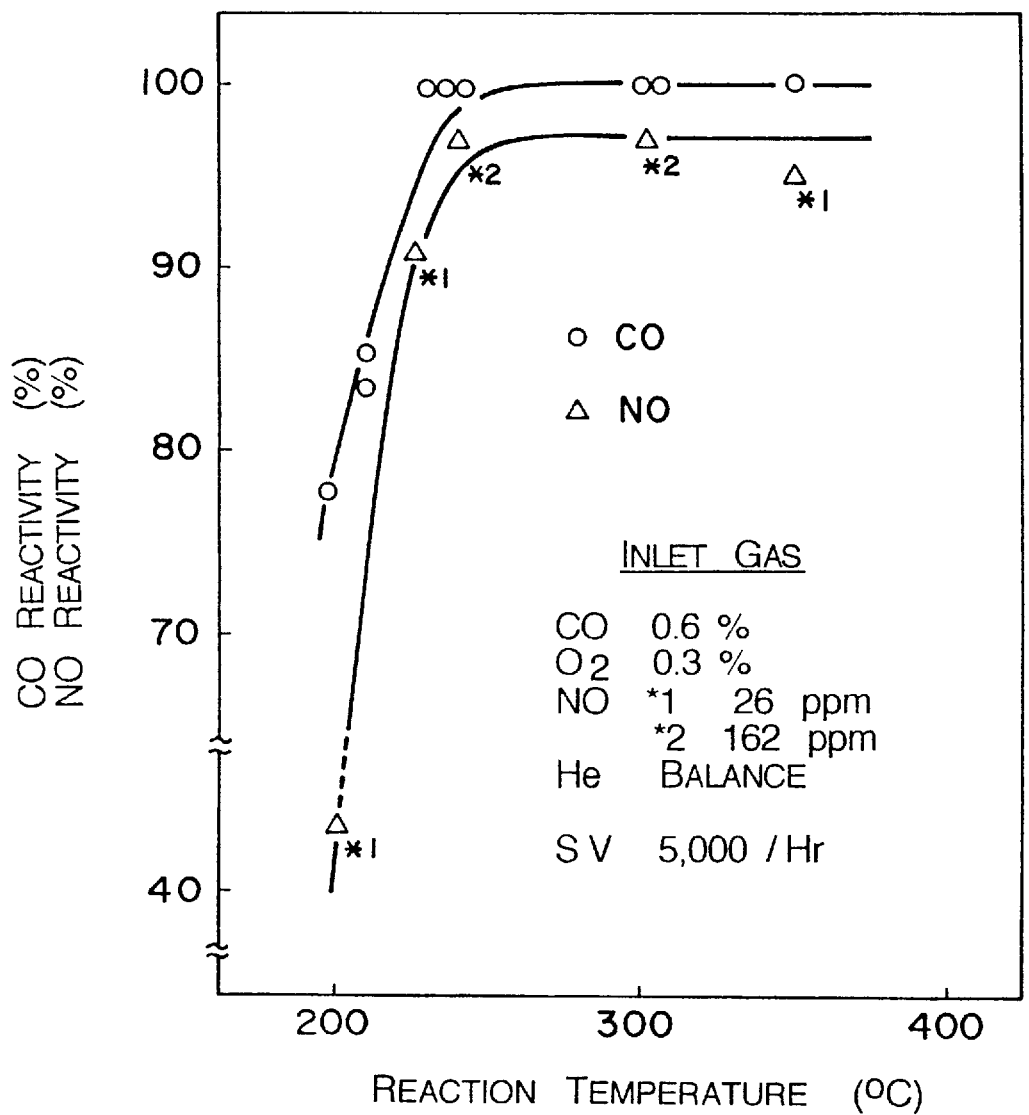
FIG. 6 is practical data of the working example according to the present method of mixed gas regeneration showing the changes of CO-reactivity and NO-reactivity depending on the temperature in case of regenerating the laser gas containing NO.

Then, He—$N_2$—$CO_2$ mixed gas containing $CO_2$ of 0.6%, $O_2$ of 0.3% and NO of 26 ppm or 162 ppm were supplied to the reactor at various temperatures. The space velocity was 5,000/Hr. The reactivity of CO and the reactivity of NO showed the changes depending on the temperature as illustrated in FIG. 6. From the data it is evident that the reactivities increase drastically at the temperature above 200° C. This effect saturates at the temperature around 240°–250° C., and therefore, a temperature higher than this limit provides no further merit. The upper limit of the reaction temperature, 350° C., was decided from the practical view points such as easiness in control.

Working Example 3

A new catalyst was packed in the reactor, to which a He—gas containing CO of 1,000 ppm was passed at 150° C. and space velocity of 300 /Hr for 1 hour to pretreat the catalyst.

Figure 8:
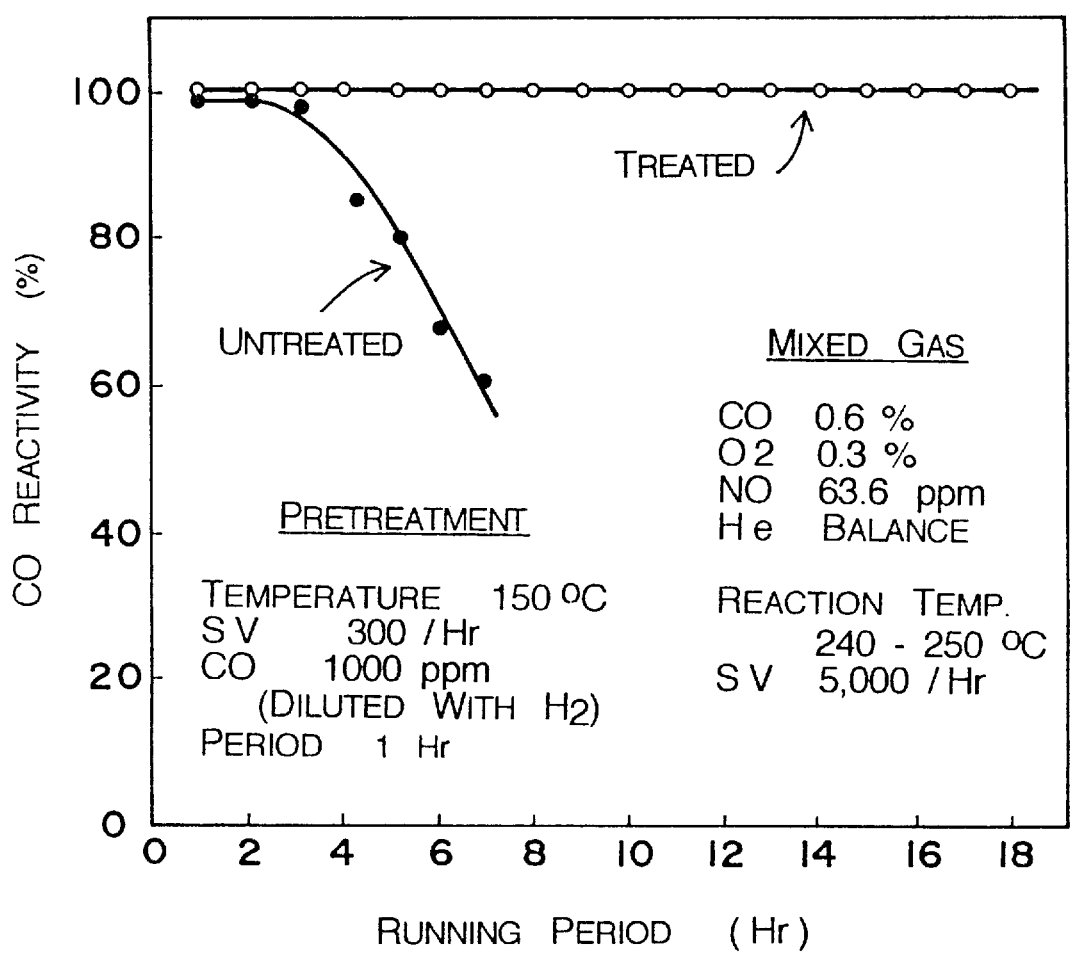
FIG. 8 is comparative data of the working example using the catalyst which is pretreated according to the present invention and the catalyst which is not pretreated by showing the changes with the passage of time of CO-reactivity.

Then, a He—CO—$O_2$ mixed gas containing NO of 63.6 ppm in addition to CO of 0.6% and $O_2$ of 0.3% (also, simulated to the state after use of the laser gas) was passed through the apparatus at 240°–250° C. for reactivation of the reactor. The reactivity of CO was maintained at 100% for a long period of time as seen in FIG. 8. The activity of the catalyst which was not subjected to the above reactivation treatment is also shown in FIG. 8. FIG. 8 shows decrease of the activity after 3–4 hours of running.

Working Example 4

Oscillation of the carbon dioxide gas laser was carried out under the following conditions:

| | |
|---|---|
| Mixed gas composition | $CO_2/N_2$/He = 1/1/5 |
| Repeating rate | 100 pps |
| Laser output | 620 W |
| Chamber volume | 1000 liters |
| Volume in the discharging zone | 1 liter |
| Pressure in the laser gas | 1 atm. |

The reactor used in Example 1 was used as the regenerator of the gas, with which the mixed gas was regenerated under the conditions below:

TABLE 1

| Quantity of Recycled Gas | Concentrations of Gases at Reactor Inlet (ppm) | | | Concentrations of Gases at Reactor Outlet (ppm) | | | Conversions of Gases (%) | | | $O_2$ Reactivity |
|---|---|---|---|---|---|---|---|---|---|---|
| (N liter/min.) | NO | $NO_2$ | $NO_x$ | NO | $NO_2$ | $NO_x$ | NO | $NO_2$ | $NO_x$ | (%) |
| 400 | 29 | 71 | 100 | 9 | 28 | 37 | 69.0 | 60.6 | 63.0 | 99.4 |
| 400 | 31 | 61 | 92 | 8 | 25 | 33 | 74.2 | 59.0 | 64.1 | 99.4 |
| 500 | 40 | 93 | 133 | 10 | 31 | 41 | 75.0 | 66.7 | 69.2 | 98.8 |
| 600 | 50 | 10 | 60 | 5 | nil | 5 | 90.0 | 100 | 91.7 | 99.8 |
| 700 | 31 | 54 | 85 | 5 | 13 | 18 | 83.8 | 75.9 | 78.8 | 99.2 |
| 1000 | 140 | 70 | 210 | 20 | nil | 20 | 85.7 | 100 | 90.5 | 99.8 |

Working Example 2

After having the catalyst poisoned by contacting $N_2$-gas containing NO of 58.1 ppm at 88° C. as described in the above working example, a He—CO—$O_2$ gas containing CO of 0.6% and $O_2$ of 0.30% was passed through the catalyst layer under the conditions of temperature 400° C., and space velocity of 2,000 /Hr for 3 hours to reactivate the catalyst.

Then, a He—CO—$O_2$ mixed gas containing NO of 66.4 ppm in addition to CO of 0.6% and $O_2$ of 0.3% (simulated to the state of the laser gas after use) was passed through the apparatus at 270° C. and space velocity of 5,000 /Hr for regeneration of the gas.

Figure 7:
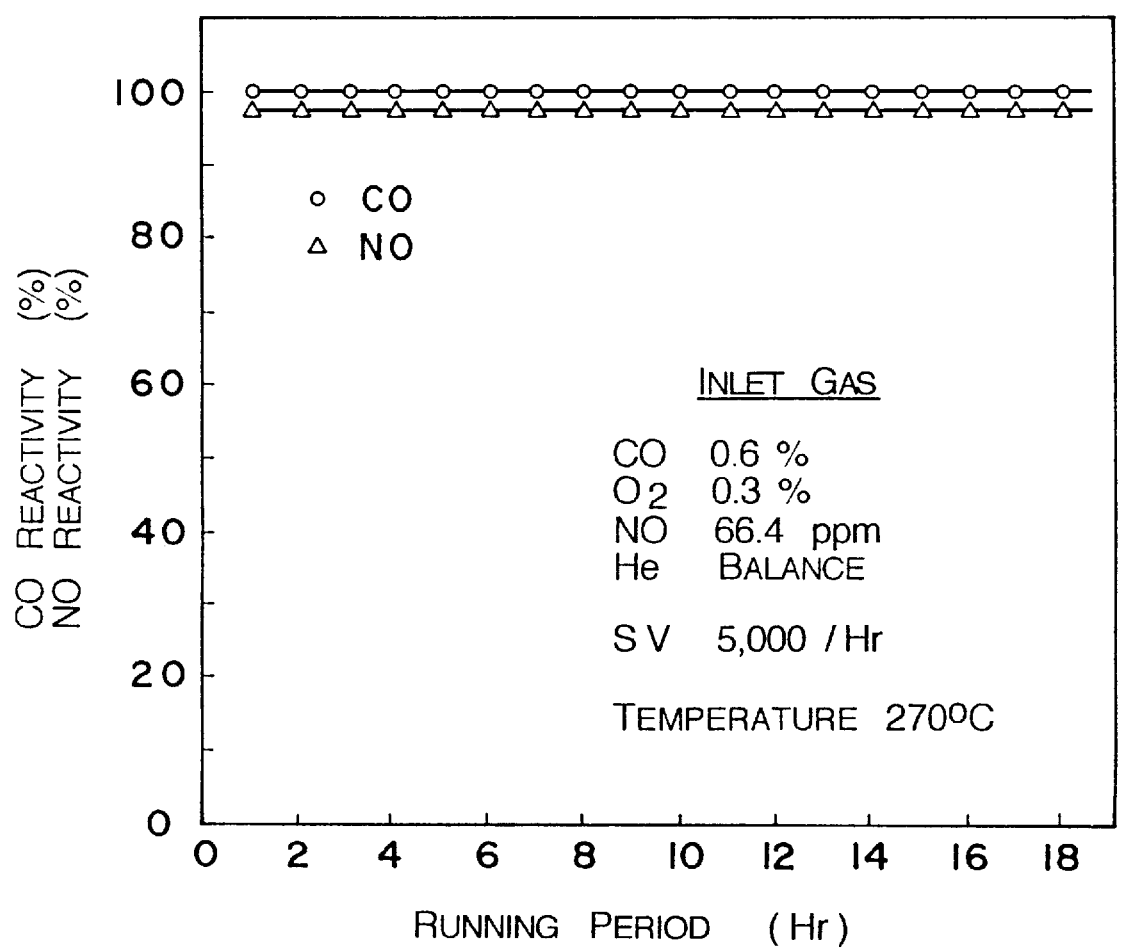
FIG. 7 is practical data of the working example according to the present method showing the changes with the passage of time of CO-reactivity and NO-reactivity in case where the laser gas containing NO was regenerated by use of a reactivated catalyst.

The reactivity of CO and the reactivity of NO are as shown in FIG. 7. It was ascertained that, in view of the fact that the activities are kept at the level as high as 100 % or near, the above reactivation of the catalyst was effective.

| | |
|---|---|
| Temperature of regeneration | 200° C. |
| Pressure in regenerator | 1 atm. |
| Rate in gas recycling | 1 m³/min. |
| Space velocity | 5,000/Hr |

Figure 9:
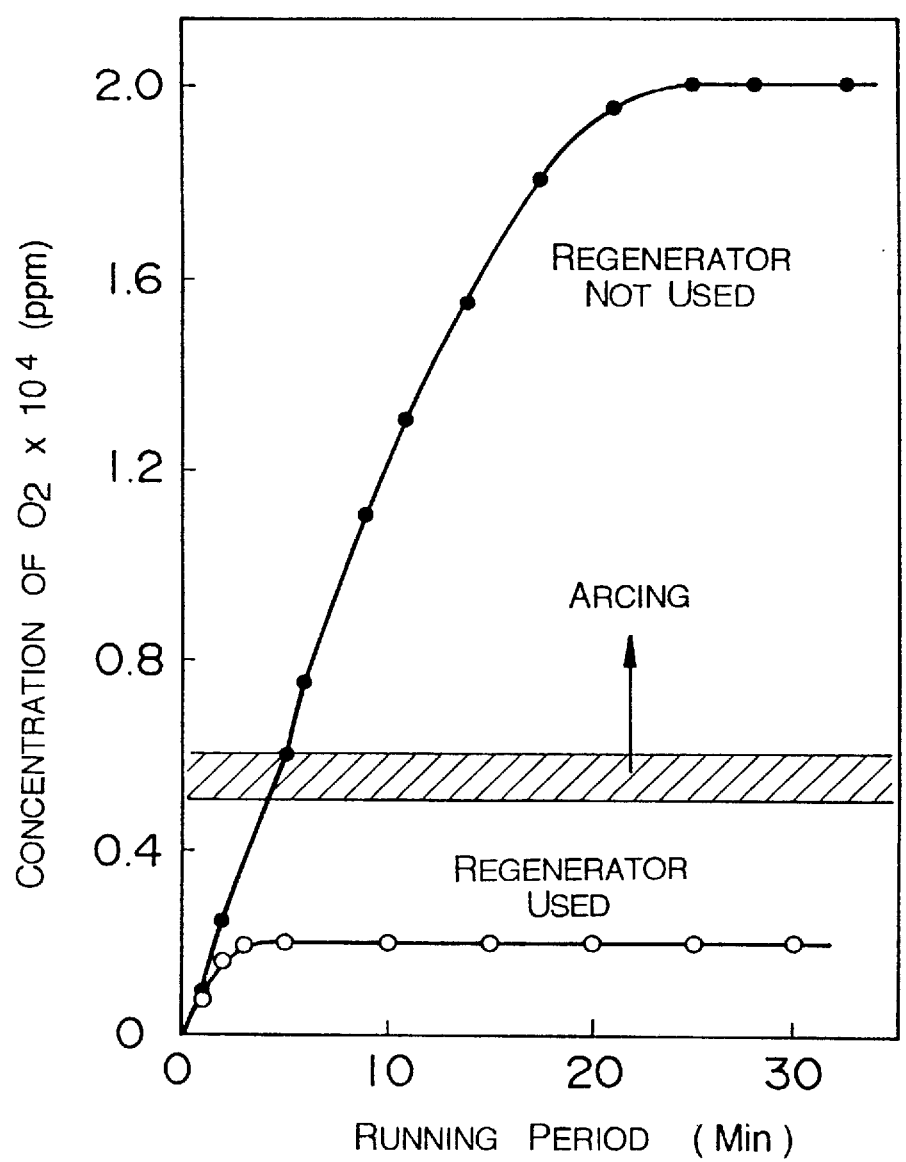
FIG. 9 is data of a working example in which the laser gas regeneration according to the present invention is combined with laser oscillation showing the changes in $O_2$-concentration in the laser gas by comparing the cases where the regenerator is used or not used.

The $O_2$-concentrations in the chamber were periodically measured. The results are shown in FIG. 9 in comparison with the case of using no gas regenerator. As seen in FIG. 9, if the regenerator is not used, arcing occurs only 5 minutes after initiation of the laser oscillation, and after 20 minutes $O_2$-concentration in the system reached to 20,000 ppm, at which level no further operation can be continued. On the other hand, in case of using the regenerator, $O_2$-concentration in the system does not exceed 2,000 ppm and operation of the laser generator for a long period is possible.

Figure 10:
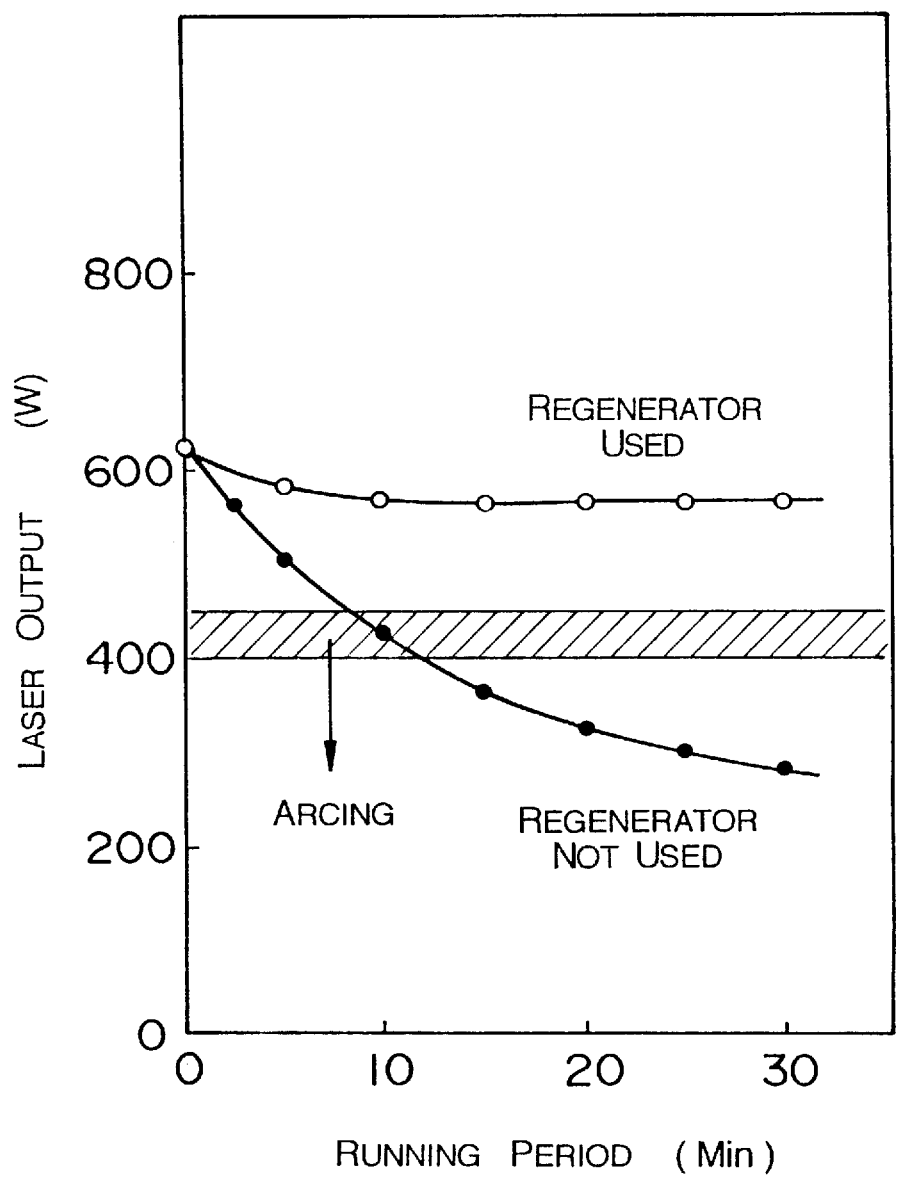
FIG. 10 is data of the working example, to which the data of FIG. 9 is related, showing the changes with the passage of time in the laser output by comparing the cases where the regenerator is used or not used.

The changes in the laser output with passage of the time was observed also in comparison of use and non-use of the gas regenerator. The results are as shown in FIG. 10. From this figure it is understood that, if the regenerator is not used, the laser output significantly decreases, and that, contrarily to this, if used, the laser output can be maintained at almost a constant level.

Working Example 5

Some lots of Pt—$Al_2O_3$ catalyst, which is the same catalyst as used in Working Example 1, each 330 g, were dried in a dryer or wetted so that the moisture content thereof may be 1.8%, 5.3%, 11.2% or 14.7%.

The catalyst lots were packed one by one in a regenerator attached to a laser apparatus having a chamber volume 0.2m³. Continuous laser oscillation-gas regeneration was carried out under the conditions of gas regeneration temperature 250° C., pressure 1 atm. and SV=5000/Hr, and decrease in the output was determined. The results are shown in TABLE 2.

From the data in Table 2 it is seen that, under the condition where a laser gas moisture content is so adjusted to such a value of 50–200 ppm, long run operation can be done without decrease in output. It has been known that it is not preferable to use a moisture content of the laser gas exceeding 200 ppm. However, if the laser gas is regenerated in accordance with the present invention, the reactions of the moisture with CO and $O_2$ are promoted by the catalyst, and as the result, rapid decrease in the output is prevented. The reason for rapid decrease in the output under a too low moisture content is considered to be rapid accumulation of $O_2$.

TABLE 2

| Running Period [Hr] | Decrease in Laser Output (%) Gas Moisture Content [ppm] | | | |
|---|---|---|---|---|
| | 30 ppm | 87 ppm | 185 ppm | 243 ppm |
| 1 | 0 | 0 | 0 | 0 |
| 10 | 2 | 0 | 0 | 3 |
| 20 | 10 | 0 | 0 | 8 |
| 30 | 15 | 0 | 0 | 13 |
| 40 | 20 | 0 | 0 | 17 |

We claim:

1. A method of regenerating He—$N_2$—$CO_2$ mixed gas for carbon dioxide gas laser comprising:

contacting mixed gas used in the laser and containing 50–200 ppm $H_2O$ with a noble metal catalyst at a mixed gas temperature exceeding 200° C. and up to 350° C. to cause reaction of CO with $O_2$ and $NO_x$ in the used gas so as to regenerate $CO_2$ and $N_2$, and to cause reaction of $H_2O$ with CO to regenerate $CO_2$ and form $H_2$, and to react $O_2$ with thus formed $H_2$;

utilizing reaction heat generated by the catalytic reactions to preheat the unreacted mixed gas;

cooling the reacted mixed gas to a temperature usable in the laser;

removing dust from the mixed gas; and recycling the mixed gas to the laser.

2. A method of reactivating noble metal catalyst having decreased activity due to poisoning by $NO_x$, comprising passing a reactivating gas consisting of 0.2–0.8% CO, 0.1–0.4% $O_2$ and the balance of He through the catalyst bed at a temperature of 400°–500° C.

* * * * *